March 30, 1965  W. E. FORTMANN  3,175,583
PRESSURE PROBE VALVE
Filed Dec. 19, 1962  2 Sheets-Sheet 1

INVENTOR
WILLIAM E. FORTMANN
BY Norman Friedland
AGENT

March 30, 1965     W. E. FORTMANN     3,175,583
PRESSURE PROBE VALVE
Filed Dec. 19, 1962     2 Sheets-Sheet 2

INVENTOR
WILLIAM E. FORTMANN
BY *Norman Friedland*
AGENT

United States Patent Office 3,175,583
Patented Mar. 30, 1965

3,175,583
PRESSURE PROBE VALVE
William E. Fortmann, Simsbury, Conn., assignor to United Aircraft Corporation, East Hartford, Conn., a corporation of Delaware
Filed Dec. 19, 1962, Ser. No. 245,698
6 Claims. (Cl. 137—625.11)

This invention relates to mechanisms for duplicating on a reduced scale the pressures of a fluid in a duct.

In certain applications, particularly those relating to aircraft, it has become desirable and even necessary to selectively pick certain stations along an air conducting duct, measure the static pressure for generating signals, which signals may be used for controlling the air flow within the duct. An example where such mechanism is desirable is in the air inlet controls which were disclosed in a patent application by David Pearl entitled "Shock Wave Position Controller" filed on the same and assigned to the same assignee. In that application it was pointed out that the device for simulating the pressures in the duct, which was called a traversing probe valve, is utilized to sample the average pressure of each of several stations taken along the large air duct and then bringing these pressures to a small remotely mounted instrument in which the pressure variant along the air duct is accurately reproduced to any desired distance scale so that measuring pressure ratio between two selected points in the shock position sensor will indicate pressure ratio between corresponding points in the inlet duct. In accordance with this invention, I have found that an instrument having a toroidal chamber communicating with various stations taken along the air duct can be utilized to reproduce on a smaller scale the pressure in the main duct. The toroidal chamber contains a plurality of spaced apart plates which are disposed in the toroidal chamber and extend transversely therein to define a series of smaller chambers or pockets. Small orifices are formed in the respective plates which permit communication between the various pockets. In addition, the taps taken along the inlet of the duct are connected to ports spaced around the periphery of this toroidal chamber to direct the pressure taken along the main duct through these chambers. By virtue of these sharp edged orifices the flow from the most rearward station flows back to the inlet to the toroidal chambers through the various pockets and into the most forward station. The sharp edged orifices are selected to define a predetermined pressure drop, which pressure drop produces a pressure profile in the toroidal chambers that corresponds to the profile in the main duct only on a reduced scale.

A wheel mounted adjacent to the toroidal chamber having a rim extending along the traverse axis of the plates is rotatably mounted. Passages formed in the wheel having one end terminating adjacent to the toroidal chamber directs fluid from the chamber to the control which is ultimately utilized for the purpose of controlling the flow in the inlet. In this manner these passages are so mounted that they may be moved to select any two points along the periphery of the toroidal chamber. Since the pressure in the toroidal chamber is a replica of the pressure in the main duct, then the point selected by these passages will correspond to points in the main duct.

An object of this invention is to provide in a device as described a valve for reproducing the pressures in a duct remotely mounted therefrom, which valve has a toroidal formed chamber, sharp edged orifices formed in plates mounted in the toroidal chamber and a rotating wheel for selectively picking points along the chamber which correspond to points along the duct.

Other features and advantages will be apparent from the specification and claims and from the accompanying drawings which illustrate an embodiment of the invention.

Figure 2:
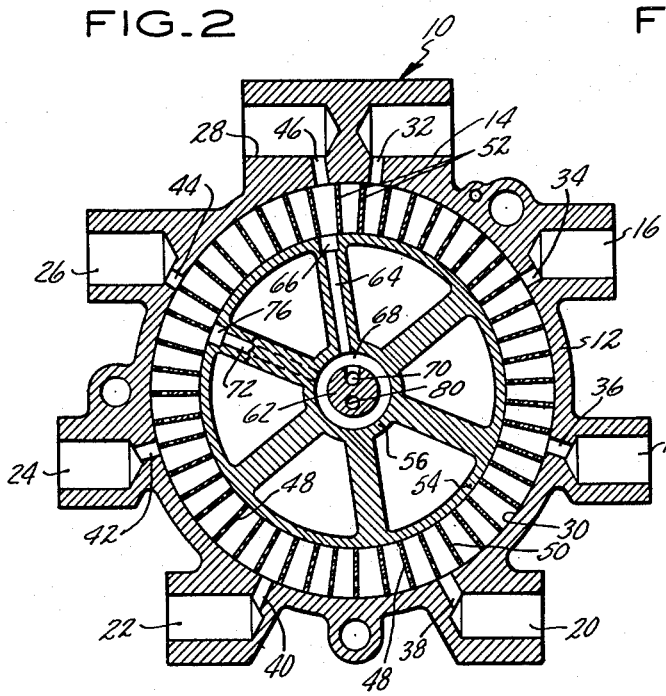
FIG. 2 is a section taken along lines 2—2 of FIG. 1.
Figure 1:
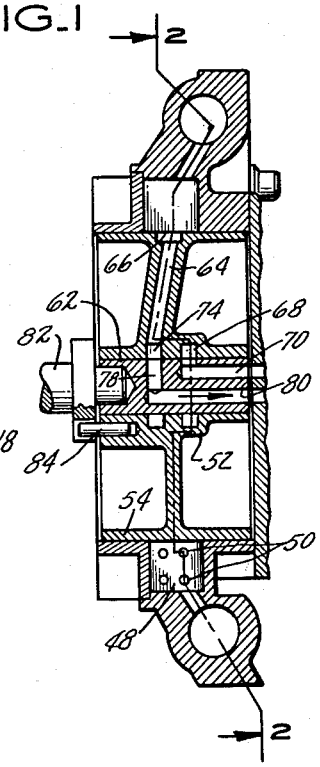
FIG. 1 is a sectional view showing the construction of the traversing pressure probe.

Reference is now made to FIGS. 1–4 which show the construction and operation of traversing probe valve generally indicated by numeral 10. As noted from FIGS. 1 and 2, the traversing probe comprises the housing 12 which contains a plurality of drill passages 14, 16, 18, 20, 22, 24, 26 and 28 spaced around the outer periphery of the housing 12.

Reference is now made to FIGS. 1–4 which show the operation of traversing probe valve 10. As noted from FIGS. 1 and 2, the traversing probe valve comprises a housing 12 which contains a plurality of drill passages 14, 16, 18, 20, 22, 24, 26 and 28. These drill passages are suitably connected with lines which are connected to pressure taps located in the duct which pressure profile is intended to be duplicated. The most forward station in the duct may register with drill passage 14 and the most rearward station in the duct may register with drill passage 28, and successive stations therebetween register with successive drill passages around the circumference of the housing 12. Because the pressure in the duct is higher at the rearward station, the flow from the last station will be directed inwardly into toroidal chamber 30 formed in housing 12 and flows from the drill passage 14 toward drill passage 28. All the other stations being sensed communicate with the toroidal chamber 46 by providing drill passages 32, 34, 36, 38, 40, 42, 44 and 46 between the chamber and the corresponding drilled passages as shown in the drawing. Disposed in chamber 30 are a plurality of plates 48 which extend traversely across the chamber to form a plurality of closed pockets. All of plates 48 contain a plurality of drill holes or sharp edged orifices 50, except two plates 52 disposed between drill passages 14 and 28. Plates 52 serve to prevent the fluid in the chamber from flowing counterclockwise instead of in the clockwise direction. Wheel or rotor 54 comprising hub 56 and a plurality of spokes 58 for supporting rim 60 is rotatably supported in housing 12. The outer periphery of the rim lies adjacent to the inner edges of plates 48 and plates 52. It will be appreciated that the peripheral edge of rim 54 is closely fitted to the edges of these plates, without interfering with the free rotational movement of the wheel. Hub 56 may be rotatably supported within housing 12 by a suitable pintle 62. Drill passage 64 is formed in one of the spokes and communicates with port 66 terminating adjacent to the outer peripheral edge of rim 54. The drill passage is connected to an annulus 68 which annulus, in turn, communicates with passage 70 which, in turn, is connected to a sensor for ultimate use as a signal indicating the pressure at a preselected station along the air duct. A similar drilled passage 72 communicating with port 76, terminating adjacent the chamber is formed in an adjacent spoke and communicates with the annulus 74, which annulus, in turn, communicates with drilled passages 78 and 80 for ultimate use as a signal indicating the pressure at a preselected station along the duct. Hence, it is apparent from the foregoing that the two spaced passages may be placed or positioned along any of the respective points within the chamber 30. The pressure selected by these drilled passages is then directed to a suitable sensor and control (not shown) for controlling the air flow and pressure in the duct. Rotary movement may be imparted to wheel 54 by suitably attaching connecting shaft 82 to pintle 62 by key 84.

As is apparent from the foregoing, the traversing probe valve labeled 10, which was just described, serves to form a pressure profile which is the duplicate on a reduced distance scale of the pressure profile evidenced in a duct. As is apparent from the above description, the traversing probe valve serves to sense a series of pressures extending along the side wall of the duct and relays a selected pair of pressures to a sensor which may be utilized to control the position of a shock occurring in the duct. The orifices formed in the plates serve to produce the pressure gradient which is the replica of the pressure gradient evidenced along the wall of the inlet duct. Thus, it can be seen that traversing probe valve 10 samples the average static pressures of each of several stations along the large air inlet duct and then brings these pressures to a small remotely mounted instrument in which the pressure variant along the main duct is accurately reproduced to any desired distance scale so that measuring pressure ratio between two selected points on the shock position sensor will indicate pressure ratio between corresponding points in the inlet duct. This enables a suitable control to sense the position of the shock wave in this duct and by virtue of this sensing and the ability to move the traversing probe along any two stations enables a suitable controller and actuator to position the shock in any desired position.

Figure 4:
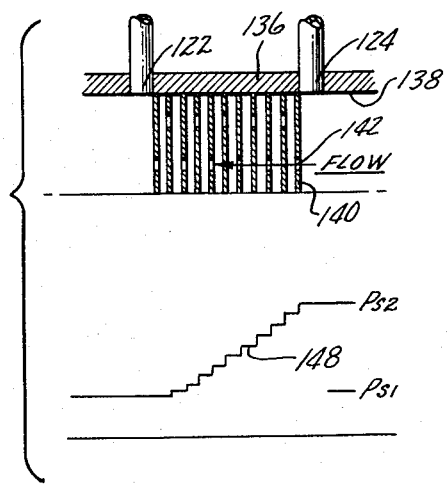
FIG. 4 is an exploded partial view of FIG. 3 showing the plates mounted between two ports in the valve together with a graphical illustration showing the pressure drop of the flow passing through the ports.
Figure 3:
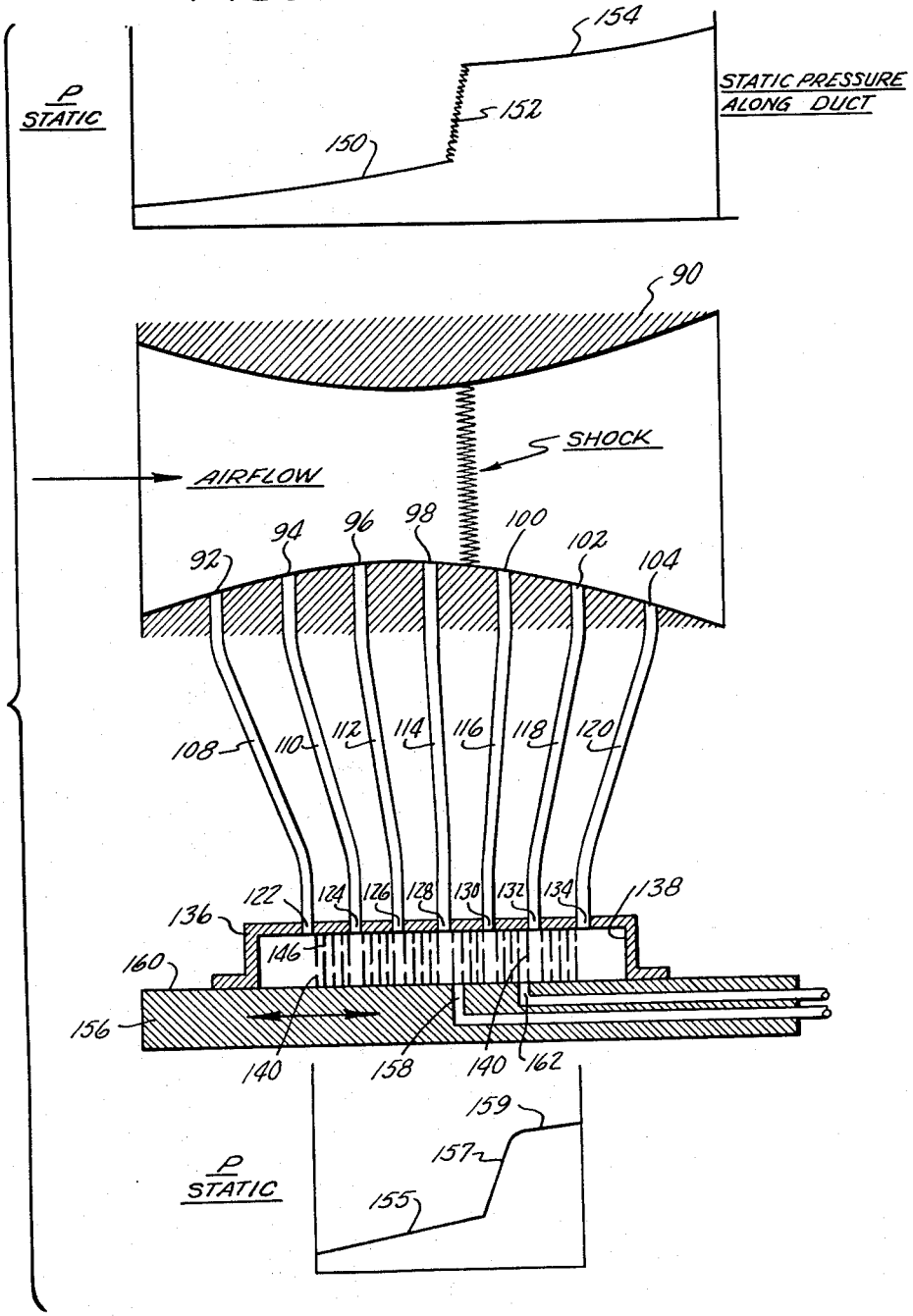
FIG. 3 is a schematic illustration of the pressure duplicating valve connected to a duct and graphically showing the pressure profile along the duct and the pressure profile along the valve.

A better understanding of the pressure probe valve may be had by referring to FIGS. 3 and 4. A convergent-divergent duct, wherein a shock is formed, for illustration purposes, is schematically shown and generally indicated by numeral 90. As can be seen from this drawing, a series of pressure taps 92, 94, 96, 98, 100, 102 and 104 extend along the longitudinal axis of the duct. Obviously, the distance between taps and the number of taps will be dictated by the particular installation and accuracy required. While a single tap is shown at each station, it is contemplated by this invention that a rake of taps may be placed around the periphery of the duct at each station. These pressure taps are connected to a remotely mounted probe valve generally indicated by numeral 160 by lines 108, 110, 112, 114, 116, 118 and 120. Ports 122, 124, 126, 128, 130, 132 and 134, formed in housing 136 of the pressure probe valve, interconnect chamber 138 and the taps through the respective lines and are proportionally spaced to the spacings between the corresponding pressure taps. Hence, the ports 122 and 124 in the housing 136 are proportional to the distance between taps 92 and 94 and the distance between ports 124 and 126 is proportional to the distance between taps 94 and 96, etc. Chamber 138 contains a plurality of plates 140 which extend traversely therein and are spaced apart to define smaller chambers or pockets. The plates are formed with several small sharp edged orifices 142 which are preselected to define the desired pressure profile between taps.

As noted in FIG. 4, the section between ports 122 and 124 has been exploded to illustrate graphically the typical details of the pressure profile. As can be seen from the graph in FIG. 4, which is a plot of pressure and distance, the profile 148 is substantially linear and decreases by a plurality of graduated steps, which steps are defined by the sharp edged orifices 142 in the plates. Obviously, the shape of the graph or profile can be varied by displacing the distances between openings or varying the size of the orifices. The profile represents the pressure in chamber 138 measured across each plate as the flow passes between ports 122 and 124. It will be appreciated that the graph in FIG. 4 corresponds to the distance between ports 122 and 124.

Now referring to FIG. 3, a graphic illustration of the pressure profile taken along the longitudinal axis of the duct 90 is shown above the duct. This graph shows the static pressure plotted against the distance of the duct taken along its longitudinal axis and as noted, the pressure gradient shown as curve 150 rises linearly until it reaches the point where the shock occurs. At this point, a substantial rise in pressure is evidenced, as indicated by line 152. The static pressure in the diffuser section of the duct then continues to rise linearly, as illustrated by line 154. It will be noted that the graphs drawn just below the pressure probe valve have the same ordinate as the graph above the pressure probe valve and the abscissa of the lower graph designates the distance extending between the ports in the housing 136 and the abscissa of the upper graph represents the distance of the taps in the duct. As noted, lines 155, 157 and 159 correspond to and follow the same patterns as the lines 150, 152 and 154 in the graph above the duct. Hence, it is apparent from the foregoing that the chamber 138 serves to provide a replica of the pressure gradient or profile evidenced in duct 90. The pressure probe valve then serves to select two stations along the duct and transmits the pressure to a remotely mounted control (not shown). To this end, a sliding member 156 is suitably mounted adjacent the open end of housing 158. Sliding member 156 contains a flat top surface 160 which underlies the opening of the chamber 138 and bears against the edges of the flat plates 140. The inner walls of the chamber, member 156 and the flat plates define a plurality of smaller chambers. Since the pressures between the most forward and most rearward stations are different, the fluid in chamber 138 will flow from the high pressure point to the low pressure point, and in this instance from port 134 to port 122. The fluid flows out into these smaller chambers by way of a series of orifices 142 formed in each of the plates. The size of these orifices is selected to provide a predetermined pressure drop thereacross to generally conform with the type of pressure gradient shown in FIG. 4. It is possible and contemplates by this invention to vary the spaces between the various taps or varying the size of the orifices to obtain any defined pressure profile which may be implemented for control convenience.

As illustrated in FIG. 3, member 156 contains a pair of spaced passages 158 and 162 which may be moved along the chamber to communicate with the various pockets formed in chamber 138. The pressure is then transmitted to a suitable sensor for controlling the position of the shock.

It is to be understood that the invention is not limited to the specific embodiment herein illustrated and described but may be used in other ways without departure from its spirit as defined by the following claims.

I claim:

1. In a pressure device for duplicating pressure in a remotely mounted duct having a housing defining an annular chamber, openings formed around the circumference of the housing and communicating with said chamber, said openings successively registering with successive openings formed along the longitudinal axis of the duct, plates in said chamber for dividing said chamber into a plurality of sub-chambers, orifices formed in said plates except for the plates extending between the opening in the housing which registers with the most forward and more rearward openings in said duct for interconnecting adjacent subchambers, a rotor having a pair of pressure pick ups rotatably mounted in a bore formed in the housing adjacent the chambers and said pick ups being in rotary engagement with the inner periphery of said subchambers.

2. Apparatus for sampling the average pressure of each of several stations taken along a relatively large duct and producing a duplicate pressure on a smaller distant scale comprising a pressure receiving device remotely mounted from the duct and having a series of openings, connection means interconnecting said openings and openings formed at each of the several stations in the duct, said pressure receiving device defining a chamber and a bore adjacent said chamber, spaced plates extending between a top inner surface and side walls of the chamber and terminating in the bore to define an annular peripheral edge, said plates and the walls together defining a series of small pockets, a rotor rotatably mounted in the bore and having a rim in rotary engagement with the annular peripheral edge, a plurality of orifices formed in said plates permitting intercommunication with the pockets, said orifices providing a pressure drop therethrough so that the presure in the chamber corresponds to the pressure of the stations along the duct, but on a predetermined distant scale, passage means in said rotor for selectively interconnecting said pockets, and means for rotating said rotor.

3. Apparatus for sampling the average pressure along each of several stations taken along a fluid conducting duct and producing a duplicated pressure on a smaller scale comprising in combination, a pressure simulating device remotely mounted from the duct and having a plurality of openings formed therein, connection means interconnecting openings formed at each of the several stations and said openings, an annular chamber formed in said device for receiving fluid from the duct, a plurality of spaced plates extending laterally in the chamber, each of said plates having three of their four edges bearing against the wall surfaces of the chambers for defining subchambers, holes formed in said plates for interconnecting adjacent subchambers, the fourth edge of said plates extending in a bore formed in said device and the plurality of plates together forming an annular peripheral edge, a rotor having a rim underlying the chamber and in rotatable engagement with said edge, said rotor also having a hub, and spaced spokes attached to the hub at one end and attached to the rim at the other end, passage means formed in at least two of said spokes and terminating in the rim adjacent said edge, means for imparting rotary movement to said rotor so as to selectively interconnect said passages and said subchambers.

4. Apparatus for producing a pressure on a smaller distant scale which is the duplicate of the pressure along a duct comprising, in combination, a pressure duplicating instrument having a housing defining an annular cavity portion and a bore adjacent the cavity portion, a plurality of openings circumferentially formed around said housing for leading fluid into said cavity portion connections for each of said openings and openings formed about the longitudinal axis of the duct for leading fluid from said duct to the openings in the housing, said cavity portion having two side wall surfaces and a top wall surface, a plurality of spaced plates extending laterally in said chamber and having edge surfaces engaging said side wall surfaces and said top wall surface, another edge of said plates extending in said bore, said plates and side wall surfaces and top wall surface defining a plurality of subchambers having openings adjacent said bore, a rotor having a rim adjacent to and underlying said last mentioned openings, spaced spokes supporting said rim, passage means formed in at least two of said spokes, said passages extending in said rim adjacent said openings, and means for imparting rotary movement to said rotor for selectively interconnecting said passages with said subchambers.

5. A pressure device for reproducting on a smaller scale a pressure gradient, said pressure device having a plurality of inlets, an annular chamber receiving flow from said inlets at predetermined spaced intervals, fluid flow obstruction means in said annular chamber for dividing said annular chamber into a plurality of fixed subchambers, bleeds in said fluid flow obstruction means interconnecting adjacent subchambers, a pair of pressure picks ups movable into communication with selected subchambers, said inlets communicate with the outer periphery of said chamber, said subchambers extend radially and terminate at the inner periphery of said annular chamber, and said pick ups are in rotary engagement with said inner periphery.

6. A pressure device for reproducing on a smaller scale a pressure gradient, said pressure device having a plurality of inlets, an annular chamber receiving flow from said inlets at predetermined spaced intervals, fluid flow obstruction means in said annular chamber for dividing said annular chamber into a plurality of fixed subchambers, bleeds in said fluid flow obstruction means interconnecting adjacent subchambers, a pair of pressure pick ups movable into communication with selected subchambers, said fluid flow obstruction means include a flat plate member and said bleeds take the form of sharp edged orifices.

References Cited by the Examiner

UNITED STATES PATENTS 2,957,345    10/60    Cheney _____ 73—147

FOREIGN PATENTS 1,234,377    5/60    France.
102,622    9/41    Sweden.

M. CARY NELSON, *Primary Examiner*.

MILTON KAUFMAN, MARTIN P. SCHWADRON,
*Examiners.*